US006643721B1

United States Patent
Sun

(10) Patent No.: US 6,643,721 B1
(45) Date of Patent: Nov. 4, 2003

(54) INPUT DEVICE-ADAPTIVE HUMAN-COMPUTER INTERFACE

(75) Inventor: Jiming Sun, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/533,388

(22) Filed: Mar. 22, 2000

(51) Int. Cl.[7] .............................. G06F 3/02; G06F 3/00; G06F 13/00
(52) U.S. Cl. .............................. 710/62; 710/63; 710/72; 710/73; 710/8; 710/10; 710/11; 710/12; 710/14; 710/15; 710/64; 710/65; 710/67; 709/321; 709/322; 709/324; 709/327; 709/328
(58) Field of Search ...................... 710/1, 2, 5, 7, 710/8, 10–12, 14, 15, 18, 19, 20, 62, 63–65, 67, 72, 73, 101, 104; 709/1, 100, 107, 108, 300, 301–305, 400, 313, 321, 322, 324, 327, 328, 330–332

(56) References Cited

U.S. PATENT DOCUMENTS

| 5,566,346 A | * | 10/1996 | Andert et al. ............... 710/8 |
| 5,781,720 A | * | 7/1998 | Parker et al. ............... 714/38 |
| 5,915,125 A | * | 6/1999 | Ajiro ........................ 710/10 |
| 5,991,546 A | * | 11/1999 | Chan et al. ................. 710/62 |
| 6,085,265 A | * | 7/2000 | Kou ........................... 710/63 |
| 6,311,228 B1 | * | 10/2001 | Ray ........................... 709/321 |
| 6,560,659 B1 | * | 5/2003 | Tobias et al. ................ 710/8 |
| 2002/0004852 A1 | * | 1/2002 | Sadovsky et al. ........... 709/321 |

* cited by examiner

Primary Examiner—Jeffrey Gaffin
Assistant Examiner—Tanh Q Nguyen
(74) Attorney, Agent, or Firm—Marger Johnson & McCollom

(57) ABSTRACT

A computer user interface and method for its operation are disclosed. The interface uses a new architecture that allows it to adapt readily to the type of input device being used to operate the computer. The look and feel of the interface depends on which input device is selected as primary. Thus, when mouse/keyboard is the primary input device, the interface-controllable elements such as scrollbars, buttons, icons, menus, lists, and dialog boxes may appear as with a conventional GUI. When a different physical input device is primary, such as pen or speech recognition, the look and feel of these elements can change to be more appropriate for that device. This change is virtually transparent to the applications utilizing the user interface.

16 Claims, 7 Drawing Sheets

INPUT DEVICE-ADAPTIVE HUMAN-COMPUTER INTERFACE

FIELD OF THE INVENTION

This present invention relates to computer user interfaces, and more particularly to a computer user interface that adapts to different input device types.

BACKGROUND OF THE INVENTION

Most computers built today can be and are operated through interaction with a Graphical User Interface, or GUI. As opposed to a simple scrolling text display, the GUI provides a much richer display through the use of bitmapped graphics. The graphical format allows the video display to not only present information in an intelligible, interesting format, but also allows the GUI to display "controls", e.g., buttons, scroll bars, pulldown menus, pop-up menus, dialog boxes, etc. A computer user can manipulate these controls with a mouse using a "point-and-click" technique to exercise various computer functions.

The controls on the display are visually manipulated by the GUI as a user operates the keyboard and mouse, thus providing feedback to the user. For instance, when a user moves the mouse, a visible mouse cursor tracks across the screen proportionally. When the user points the mouse cursor at a screen "button" and clicks the appropriate mouse button, the screen button may, through shading techniques, be made to appear to be depressed while the user holds the mouse button down. Or when a user selects a scroll bar and moves the mouse, the scroll bar may appear to be "grabbed" and moved by the mouse, as it moves along the screen proportionally with the mouse movement.

Early GUIs were custom subroutines built into specific application programs. These GUIs responded to hardware interrupts for mouse and keyboard input, and drew graphics directly to the computer's display. If the GUI was to work with more than one type of hardware, the GUI had to be built with knowledge as to the peculiarities of each type of hardware that the GUI was compatible with.

Modern GUIs typically take a different approach, wherein they are either an integral part of the computer's operating system (OS), or run "on top of" the OS. Instead of interacting with the hardware directly, application programs can interact with the GUI. This provides several advantages. First, the GUI can provide a device-independent interface to the applications, such that each application need not know about the hardware peculiarities of the display, input device (s), printers, communications ports, etc. The GUI uses device drivers to translate I/O between these physical devices and the applications. Second, the GUI allows multiple applications to share a common display, e.g., by associating a window with each running application, and then multitasking the applications. And third, the single GUI provides a consistent "look and feel" for a wide variety of applications, allowing a user familiar with the GUI to quickly master a new application.

Applications work with a typical GUI, such as the GUI provided by Microsoft Windows™, using a set of GUI subroutines and messaging. The application calls the GUI subroutines to create, manipulate, and eventually destroy graphical "windows" on the computer display. The application can also call GUI subroutines to create standard controls and dialog boxes. When the controls are subsequently manipulated, the GUI provides visual feedback to the user, and at the same time dispatches messages to notify the application that one of its requested controls has been manipulated by the user, and how. The GUI queues other messages for the application as well—messages that notify the application when it needs to repaint part of one of its windows, when keyboard keys or mouse buttons have been manipulated, etc.

The device-independent interface also allows well-behaved applications to operate with input devices other than a traditional mouse, with no special capabilities on the part of the applications. Trackballs, joysticks, J-sticks, glide pads, pen tablets, and other input devices can emulate a traditional mouse by using a driver that translates the input device's sensed inputs into equivalent mouse-like movements. The GUI reports these translated inputs as mouse movements to the application.

As another example of how the device independent interface operates, mouse hardware is now available with a top-mounted wheel that, when rotated, allows a user to scroll the client window that has the input focus. The GUI has been modified to take wheel rotation physical inputs and translate them into scroll messages. To the application, wheel rotation produces a scroll message just as if the user had pointed the mouse at a slider, clicked, and dragged the slider. But without GUI modification to accept the new type of physical input (i.e., scroll wheel input), this additional input could not be made to have this time-saving effect.

BRIEF DESCRIPTION OF THE DRAWING

The invention may be best understood by reading the disclosure with reference to the drawing, wherein.

DETAILED DESCRIPTION OF THE PREFERRED EMBODIMENTS

Figure 1:
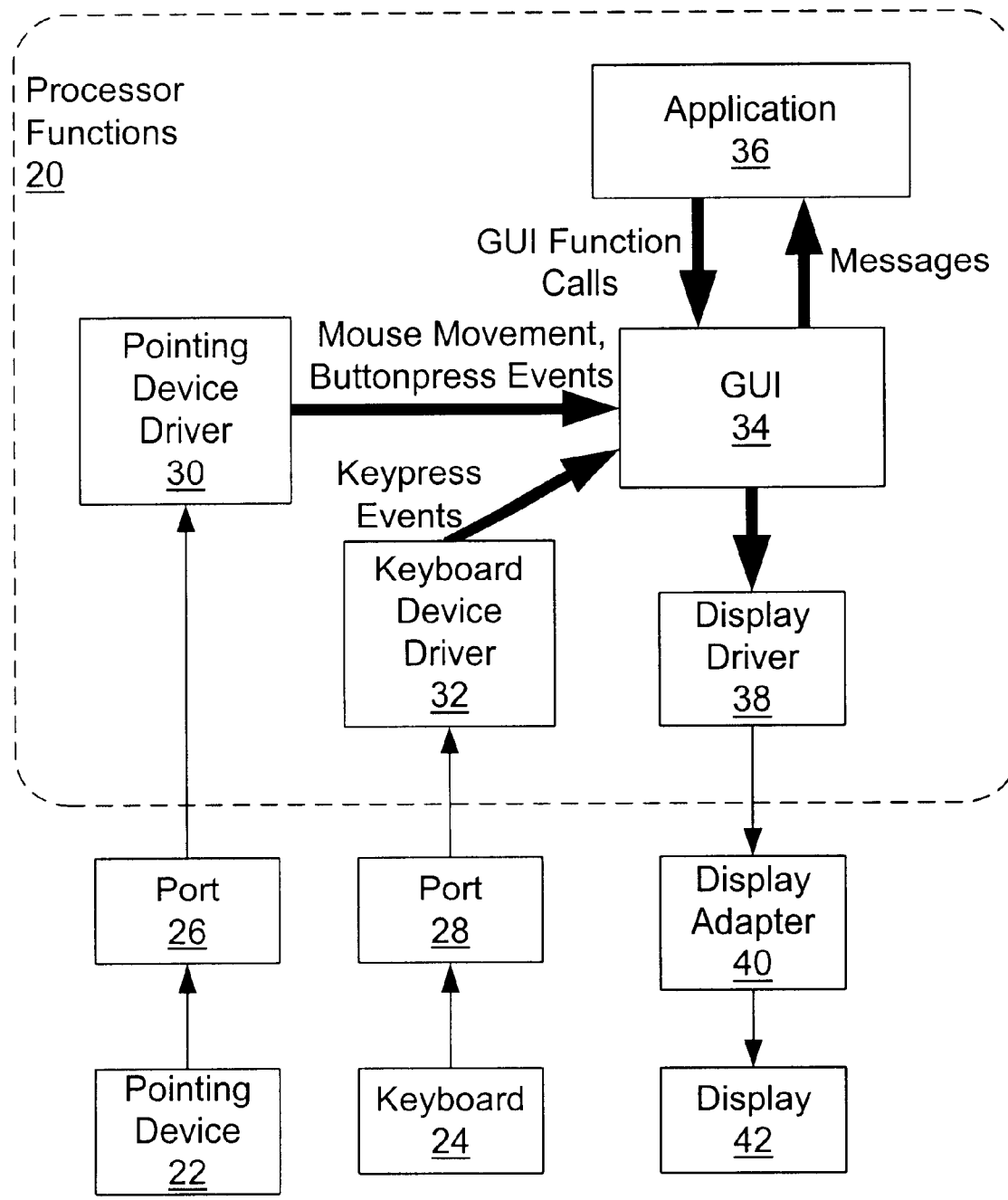
FIG. 1 illustrates a block diagram of prior art GUI operation.

The following embodiments are exemplary. Although the specification may refer to "an", "one", or "some" embodiment(s) in several locations, this does not necessarily mean that each such reference is to the same embodiment(s), or that the feature only applies to a single embodiment.

For most people familiar with a Roman-character-set language and performing traditional computer tasks, the mouse/keyboard-based GUI is efficient and effective. But with the popularity of the Internet, computing displays are now appearing in non-traditional locations, such as on the family television, where mice and keyboards may be secondary, nonpreferred, or non-existent forms of input. As hardware becomes available with more computing power in smaller form factors, systems without a keyboard/mouse primary interface will also become common. Computer use is also expanding in many areas of the world where the Roman character set (and thus the traditional keyboard) are unfamiliar, and where local alphabets may have thousands of characters. In these and other non-traditional computing environments, alternate input devices and interaction methods may be far superior to the mouse/keyboard-based GUI.

In current GUI implementations, the use of alternate input devices with a GUI generally involves making the device's inputs look like mouse movements and keyboard keystrokes to the GUI and its applications. Properly translated by the device driver, these inputs allow the user to transmit ASCII characters, drag a cursor, click, double-click, etc.—i.e., operate the GUI in a mouse/keyboard mode. It is recognized herein that this approach have several potentially large-drawbacks.

A first drawback is that current GUIs only understand mouse and keyboard events. Without explicit GUI modification such as was done with the scroll wheel, the GUI has no way to use inputs from alternate input devices in a more natural manner. If an application wishes to access non-traditional, untranslated inputs, it must bypass the GUI and deal with the input hardware directly. "Device independent" operation in the traditional GUI sense can only be achieved if the input device makes itself look like a keyboard or mouse.

A second problem lies within the design of the GUI itself. Even if other types of input could be understood by the GUI, the GUI control interactions are still defined in terms of point and click/keypress operation. To operate the GUI controls, device inputs must somehow be interpreted as cursor pointing and clicking, ASCII keypress, etc., operations. This can be a cumbersome task, depending on the type of input device employed.

The disclosed embodiments overcome these drawbacks by use of an adaptable user interface. That is, instead of a mouse- and keyboard-centric approach—where other types of input devices must use drivers to map themselves into mouse/keyboard inputs—the user interface adapts itself to the type of input device being used. Ideally, this allows a more natural interaction with the user, regardless of input device type, in a manner that is or can be transparent to most applications.

In preferred embodiments, physical device inputs generate logical events based on the physical device's logical function—these events are therefore not tied to the peculiarities of how the physical device must be manipulated to perform these logical functions. For example, "clicking" is a mouse operation, but the underlying logical operation is some sort of action request. By defining a "Command" logical device that handles action requests, actions can be generated in whatever method is most suitable for a given input device, instead of forcing each type of device to emulate a mouse click. Furthermore, the look of the user interface (UI) in the disclosed embodiments preferably adapts to the type of input device being currently employed. Thus, the "look and feel" of the UI can be dynamic, even changing as a user switches between several active input devices. And also unlike current GUIs, the UI of these embodiments preferably can be extended to use new "look and feel" methods as new input devices become available—without reprogramming the UI itself.

The preferred embodiments disclosed below were selected by way of illustration and not by way of limitation. As used herein, a "physical input device" refers to a device for providing human input to a computer. Such devices can sense body movements directly (mouse, keyboard, trackball, glidepad, glove, remote control unit, etc.) or indirectly (pen/tablet systems, camera-based gesture sensing and eye-tracking, voice recognition systems, etc.). Future physical input devices may sense other forms of human input, such as electrical nerve inputs. The physical input device need not be physically attached to the computing device operating the user interface, or to the computing device operating the display, although perhaps the most common configuration has all three devices connected directly together.

Briefly and by way of introduction, FIG. 1 illustrates a prior art model for GUI computing. Items in dashed box 20 are software-implemented functions that run on the system processor; other items represent hardware. Where the software is shown communicating with peripheral hardware, it is doing so because the hardware is, e.g., performing direct memory access operations across a system bus and/or interrupting the microprocessor.

A pointing device 22 (e.g., a mouse, trackball, joystick, or glidepad) and a keyboard 24 are connected to ports 26 and 28, which are typically either IEEE RS232 serial ports, PS/2 ports, Universal Serial Bus (USB) ports, or similar technology. A pointing device driver 30 processes the inputs received at port 26, producing mouse movement and buttonpress events. A keyboard device driver 32 processes the inputs received at port 28, producing keypress .events. Ports 26 and 28 could also be a single port shared by multiple devices.

GUI 34 receives mouse movement, buttonpress, and keypress events from drivers 30 and 32. GUI 34 moves the mouse cursor, manipulates other screen controls, and performs other functions that are its responsibility in response to these events (such as generating messages to an application that one of the application's windows has been resized, or that one of the application's controls has been manipulated). GUI 34 also determines whether one or more running applications 36 should receive notification of the raw input events, and if so, sends messages containing information about the events to application 36.

Application 36 also communicates with GUI 34. Application 36 requests that GUI 34 create client windows, screen controls, menus, dialog boxes, etc., that application 36 needs to accomplish its function. Application 36 may request that GUI 34 update these objects in response to received messages, or in response to the changing output of the application.

GUI 34 communicates with display driver 38 to produce displayable output corresponding to the requests of application 36 (if allowed by the GUI), and to the GUI-controlled portions of the screen. Display driver 38 communicates with display adapter 40, which connects in turn to display 42 to produce displayable output. Communication with the display adapter may be by sharing a bitmapped version of the desired screen, although some sophisticated display adapters contain hardware accelerators that accept drawing commands directly.

In this user interface model, the only input events that the GUI can understand and process are mouse and keyboard events. This limits the types of information that can be conveyed to the GUI. As a further consequence, the ways in which the GUI can respond to events are limited to those that seem most appropriate for mouse and keyboard input.

Figure 2:
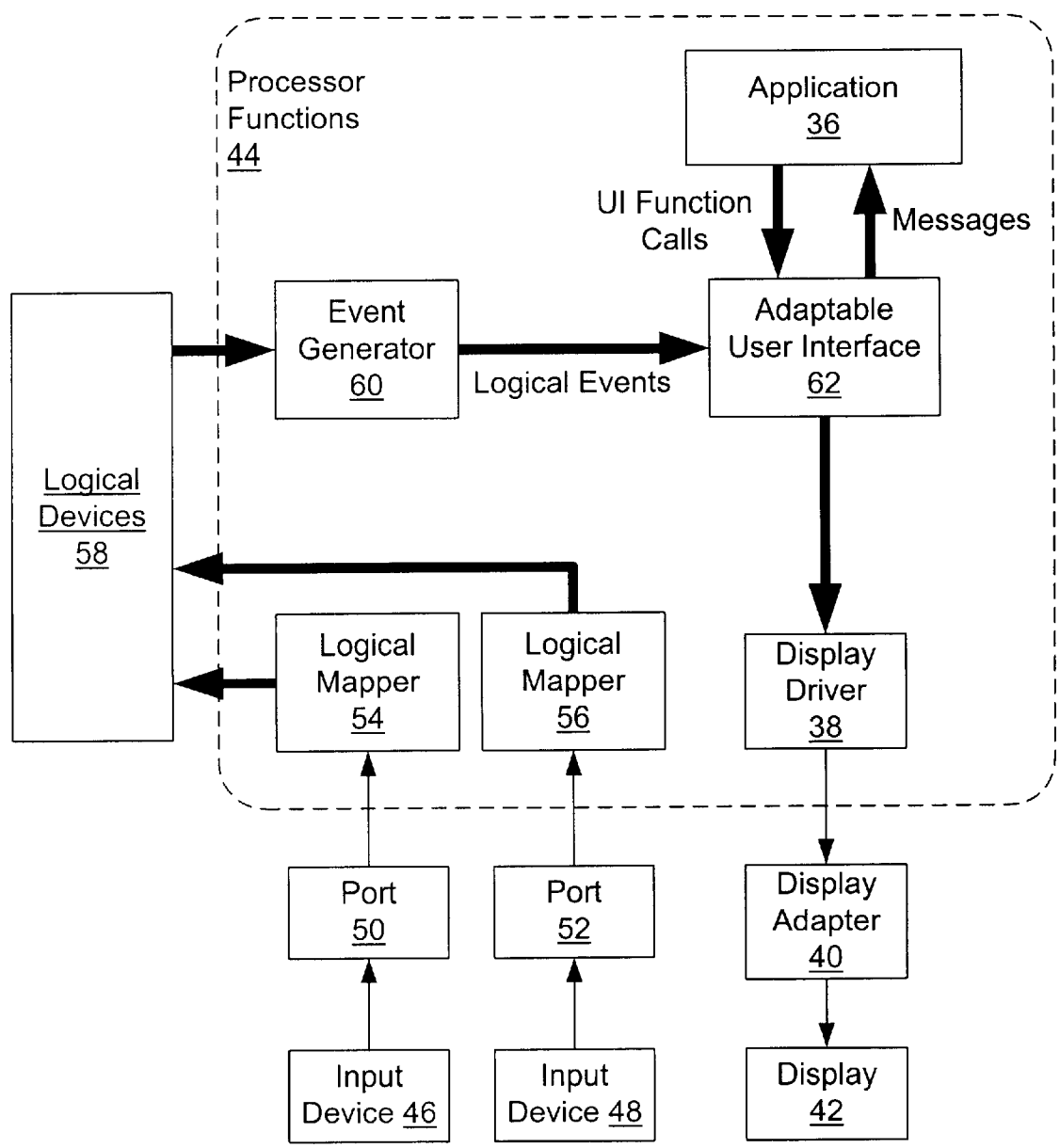
FIG. 2 illustrates a block diagram for an adaptable user interface operating environment according to an embodiment of the invention.

Turning now to the details of the embodiments, FIG. 2 shows a user interface model according to an embodiment of the present invention. Two physical input devices 46 and 48 are shown, although in principle the present invention is not limited to any particular number of input devices. These devices may be selected from traditional pointing devices and keyboards, pen/tablets, speech digitizers, gesture or eye movement inputs, etc. Input devices 46, 48 connect respectively to ports 50, 52. Logical mappers 54 and 56 read input respectively from ports 50 and 52 and map this input to one or more logical devices 58. Although logical mappers 54 and 56 are shown as separate, their functions could be combined in a common mapper that supports multiple input devices. It is possible that a mapper for a particular device may utilize special-purpose hardware to accomplish a mapping function.

Preferably, the input devices are enumerated and classified when the computing device running processor functions 44 boots. If the devices are connected to a port that allows hot plugging (e.g., USB), a device may also be enumerated and classified at the time it first becomes visible to the system. USB devices in general can be identified during USB enumeration, allowing true "plug and play" operation. PS/2 devices will report their device ID's to the processor when their port is queried, allowing a PS/2 mouse, mouse derivative, or keyboard to be identified during boot phase. RS232 serial port device identification is not well defined, which means that serial port input devices must be configured into the system via a loaded driver, or these devices will not be recognized via the system. (In the present invention, this "driver" can be incorporated into the logical mapper supporting the input device.) As another example, an Audio IN port can be connected to audio input devices. This port is generally built into the system (or an attached audio card), and is generally known to the system through the internal hardware configuration database.

Once the attached input devices have been enumerated and classified, logical mappers 54 and 56 can map physical device input into input from appropriate logical devices 58. The logical device is preferably a software construct-a logical device may, for instance, take the form of instances of a data structure, resident in random access memory, that can be written to by logical mappers and read by event generator 60. While the logical device provides input to event generator 60, this input typically represents an interpretation of the input produced by physical devices. For example, the following types of logical devices are defined in one embodiment:

Locator—a locator logical device describes a screen location corresponding to the state of an input device. This can be derived from mouse movements or other pointing device movements. With a pen, it can relate to the absolute location of the pen on its writing surface. With speech recognition, it can represent the interpretation of a command to transfer focus to a particular screen location or displayed control element. Gesture commands or eye tracker inputs can likewise be interpreted to represent a particular screen location or movement.

Text—an ASCII text (or other textual format) logical device provides information about a character from a defined character set. With a traditional keyboard, this logical device reports keypresses. With a pen, one or more strokes can be recognized as a character from the defined character set by the mapper. Likewise, a speech recognition mapper can represent recognized words (that are not identified as commands) as textual input. The Text logical device is not necessarily confined to Roman characters, and is preferably extendable to any desired character set.

Command—a command logical device provides a direct indication to the UI that the user has operated the corresponding physical input device in a manner consistent with a UI-understandable command or action request. For instance, buttonpresses on a pointing device or gaming remote can map to selection commands, or certain key sequences on a keyboard can map to commands to the UI. With a pen, given strokes or combinations of strokes can represent potential commands. A speech recognition mapper may identify selected groups of sounds as commands, and a gesture mapper may likewise interpret certain gestures as commands.

Valuator—a valuator logical device provides general values to the UI. For instance, a valuator may represent raw or processed data from a physical device, like force/time data for a force sensor, raw speech samples or derived speech parameters for an audio device, a description of a pen stroke, raw or processed data for eye tracking or gesture inputs, etc. Typically, valuators will not be of any particular use to the UI itself, but may be passed in a message to an application. It is likely that a valuator logical device would therefore include a mechanism for turning it off/on as needed by a running application.

The foregoing examples show that one input device can map to multiple logical devices, and that multiple input devices can map to the same logical devices. Indeed, some logical device inputs may even be a combination of inputs from several devices, e.g., a button pressed on one input device while a word is spoken could be used to change the meaning of the word from a Command input to a Text input.

Not only can one input device map to multiple logical devices, but one input on a device can map simultaneously to several logical device inputs. Consider, as an example, the case of a user drawing a circle with a pen. This could create a Locator device input, with the location defined at the center of the circle. This same circle could create a Text device input for the letter "o". Furthermore, if a circle drawn with pen is defined as a method of selecting or operating a graphical object, this same circle could create a Command device input for a selection operation. And if the Valuator device is enabled for pen input, this same circle may be parameterized and supplied to the UI as a Valuator input. The user interface could receive events (to be described next) from each of these logical devices for this same physical user input. The UI would then have the task of sorting out, e.g., based on what was displayed on the screen at the location corresponding to the drawn circle, which logical input(s) were meant by the user.

Figure 3:
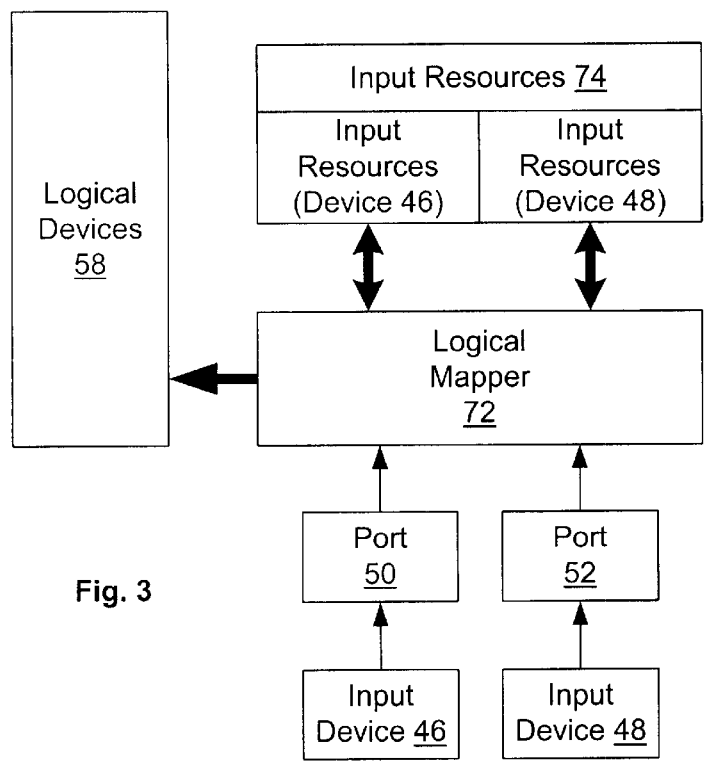
FIG. 3 shows a block diagram for a physical-to-logical input mapper according to an embodiment of the invention.

FIG. 3 shows one arrangement for an expandable logical mapper 72. Logical mapper 72 uses input resources 74 to map physical inputs to logical devices 58. For instance, mapper 72 uses one set of resources for input device 46, and a second set of resources for input device 48. In one implementation, the input resources for a particular input device include subroutines to be called by the logical mapper when input is received from that particular device. These subroutines define mapping for that device onto the logical device types. Mapper 72 controls calling and sequencing for the input resources, and sequencing of mapping output onto logical devices 58. In some instances, logical mapper 72 may also merge mapping output from different input resources before sending the output to logical devices 58. As new input devices are developed or integrated into the UI, they can be added into the logical mapping function by adding a corresponding set of input resources.

Returning to FIG. 2, the logical device outputs are available to event generator 60. Event generator 60 has the responsibility of merging the outputs from all logical devices into a logical event stream for presentation to the adaptable user interface 62. An event can, e.g., consist of the logical device type, followed by type-dependent fields describing the event. The event may contain further information, such as a time stamp or an identifier for the physical device(s) that generated the input causing the logical event to be generated. For instance, a Locator event may have fields for x screen position, y screen position, timestamp, and physical device identifier. A Text event may have fields for language, language code, break/make (mostly useful with keyboard inputs), timestamp, and physical device identifier. A Command event may have fields for command type, command parameters, timestamp, and physical device identifier. And a Valuator event may have fields for valuator type, valuator data, timestamp, and physical device identifier.

Figure 4:
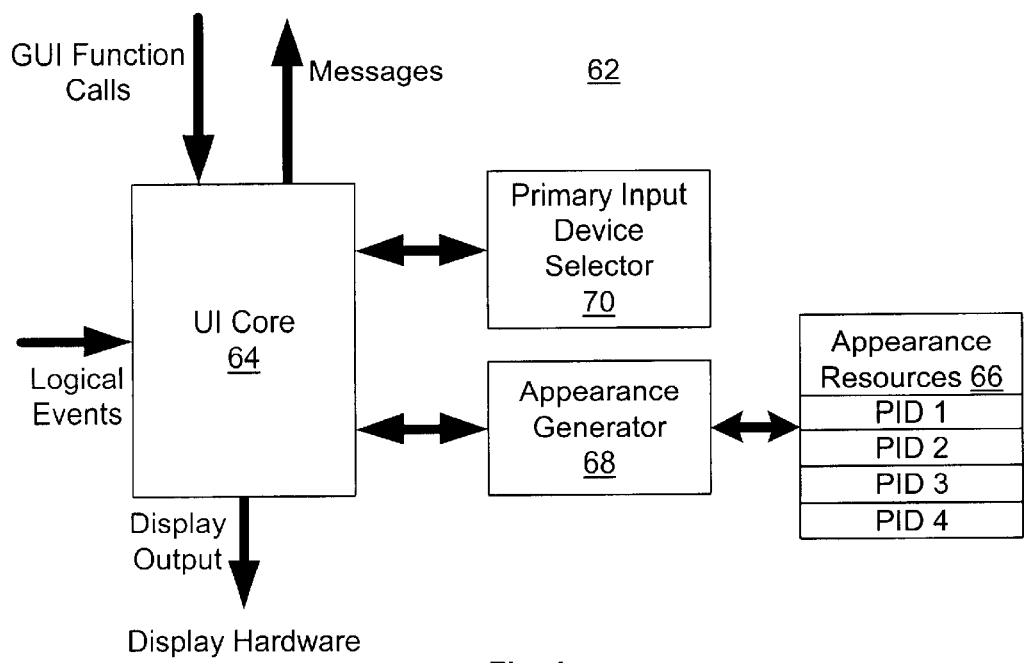
FIG. 4 shows a more detailed block diagram of an adaptable user interface according to an embodiment of the invention.

FIG. 4 shows one possible embodiment of adaptable user interface 62 according to the invention. This embodiment illustrates two aspects of the invention that are preferably implemented together, although each may have some functionality without the other. The first aspect is a display appearance that is adaptable to the type of physical device selected as a primary input device. The second aspect is a primary input device selection, preferably automatic, that aids the user interface in selecting a primary input device.

To implement these aspects, adaptable user interface 62 supplements its user interface core 64 with an appearance generator 68 and a primary input device selector 70. UI core 64 is comparable to the UI core of other interfaces, i.e., it handles communications with applications and produces a display output, and may perform other functions such as memory management and multitasking. Logical events, however, replace the mouse and keypress events of a prior art GUI as a source of input. UI core 64 relies on appearance generator 68 to help it render the screen display in a manner adapted to the selected primary input device. UI core 64 relies on primary input device selector 70 to set an initial primary input device, and preferably, to modify the designation of a primary input device automatically, as needed, while the UI runs.

The preferred implementation of appearance generator 68 is as a set of routines that rely on appearance resources 66, and on the current primary input device designation provided by selector 70, as inputs in creating graphical interface elements on the UI's display output. The graphical interface element-generating resources are stored in appearance resources 66 as parallel sets of element resources, one set for each possible primary input device (PID).

Figure 5A:
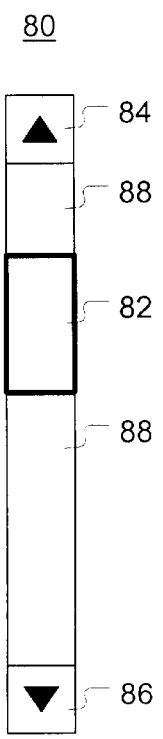
FIGS. 5a, 5b, and 5c show one graphical interface element, a scroll bar, as adapted by a user interface embodiment for three different types of primary input devices.
Figure 5B:
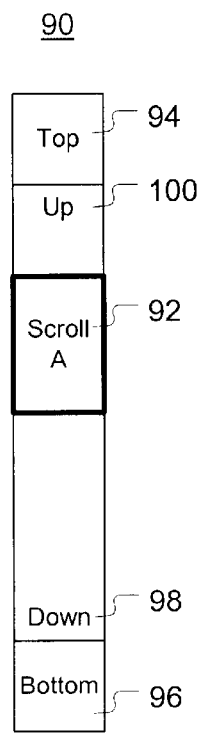
Figure 5C:
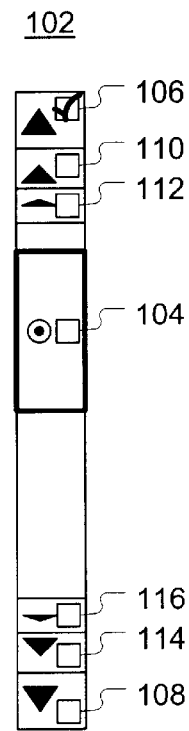

As a first example of how appearance resources can be adapted to the current PID, consider FIGS. 5a, 5b, and 5c. FIG. 5a shows a common graphical interface element, a vertical scrollbar 80. By responding to logical Locator events representing mouse cursor position and logical Command events representing mouse button presses, the scroll bar functions as follows: by pointing the mouse at slider 82 and depressing a preset mouse button, slider 82 can be "grabbed" and moved up or down along scrollbar 80, proportional to mouse movement, until the mouse button is released. By pointing and clicking on arrowed scrollbar segments 84 and 86, slider 82 can be moved, respectively, to the extreme top or extreme bottom of slide bar 88. And by pointing and clicking on slide bar 88, the slider can be "paged" up or down depending on whether the mouse cursor is above or below slider 82 when clicked. This behavior is dictated by the scrollbar appearance resources for a mouse/keyboard primary input device.

FIG. 5b shows the same graphical interface element as FIG. 5a, as it appears when the primary input device is a voice recognition input. To avoid requiring the user to issue, and the user interface to comprehend, long requests like "I want to move that scroll thingy way over on the right up a little bit", the appearance resources adapt to the new primary input device by assigning a simple letter name to the scrollbar (Scroll A), and providing other word cues for possible user commands (Top, Bottom, Up, Down). These cues are displayed on scrollbar elements 92, 94, 96, 98, and 100, and are understood by the adaptable user interface as belonging to the scrollbar. Thus scrollbar 90 can be referred to in verbal commands such as "Scroll A Down One Line", "Scroll A Page Down", or "Scroll A Bottom". When multiple scrollbars are displayed concurrently, the appearance generator assigns each a unique name that can be used by the UI to verbally identify that scrollbar. Note that the scrollbar can still be mouse-manipulated as well, but the scrollbar's look is adapted to a primary verbal input device.

FIG. 5c shows yet another appearance 102 for the scrollbar, this time for a pen as a primary input device. A series of checkboxes 104, 106, 108, 110, 112, 114, and 116 appear on scrollbar 102, and can be used by the pen to perform scrolling without "clicking". The Command logical device is configured to indicate a selection event when the handwriting input device mapper recognizes a checkmark (V) stroke (the selection event could be a user setting, and could be as simple as a simple pen tip-tap in a box). If the location of the stroke corresponds to or overlaps one of the checkboxes on scrollbar 102, this is interpreted to activate the scroll function indicated beside the checkbox. For instance, if checkbox 104 is selected, the slider is "grabbed" and moves with following strokes until checkbox 104 is unselected. Checkboxes 106, 110, 112 indicate movements to the top of the scroll range, page up, and line up, respectively. Checkboxes 108, 114, and 116 indicate similar movements downward.

Note that the application using the scrollbar need not, and indeed will not in general, know that the scrollbar appearance or method of manipulation has changed. If the scrollbar width changes to accommodate the new display appearance, this may cause a change in size of one of the application's client windows, but virtually all applications are designed to handle resize events. The scrollbar need not even be a bar. For instance, for a given input device, the scrollbar could be replaced with a pie that can be sliced and manipulated. Regardless of scrollbar appearance, the application will receive the same messages when the user uses an input device to scroll: a scroll event has occurred, and the distance to be scrolled.

Figure 6A:
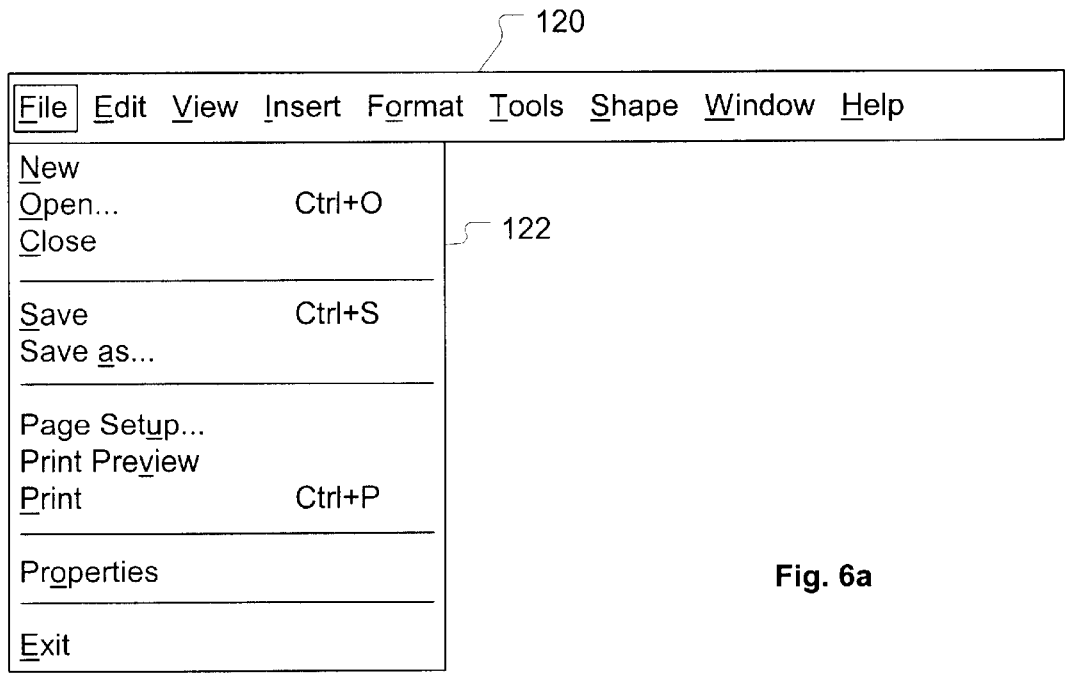
FIGS. 6a and 6b show a second graphical interface element, i.e., a top-level and drop-down menu, as adapted by a user interface embodiment for two different types of primary input devices.
Figure 6B:
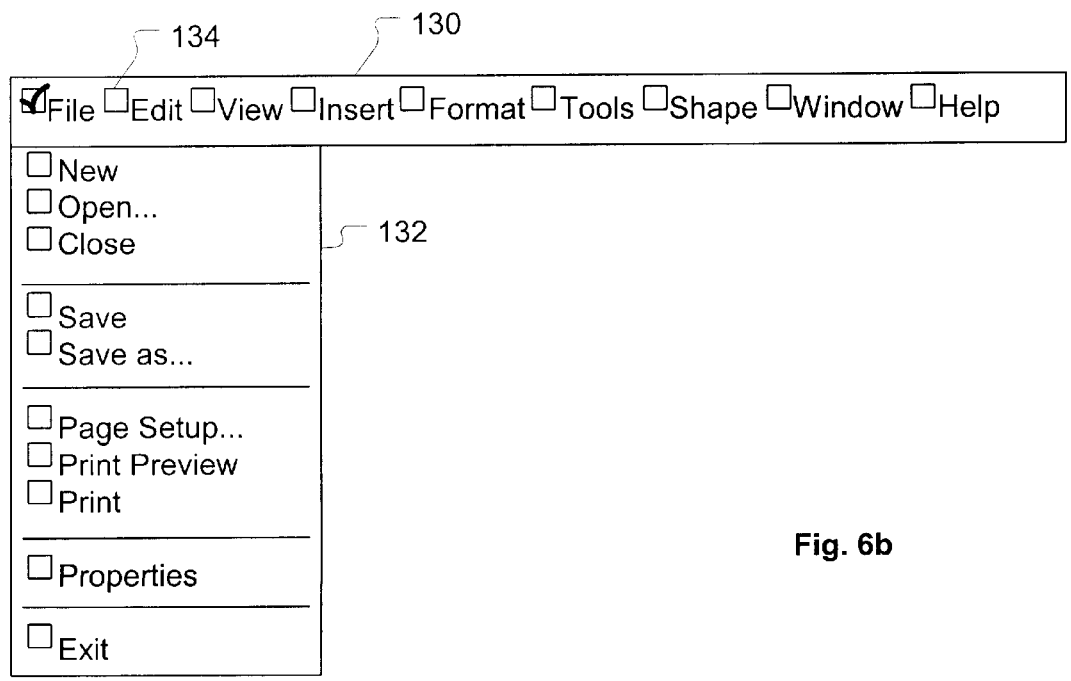

FIGS. 6a and 6b further illustrate the adaptability of the user interface, this time for menu graphical interface elements. Top-level menu 120 and pulldown menu 122, as shown in FIG. 6a, are configured for traditional mouse/keyboard operation. To activate pulldown menu 122, for instance, the user points and clicks on the word "File" in top-level menu 120, or depresses the "Alt" key and then the "F" key before releasing the "Alt" key on the keyboard, while the window having menu 120 is active. In the former case, a Locator logical device event indicates mouse cursor position, and a Command logical device event indicates a select action. In the latter case, a Command logical device event indicates an "Alt+F" event (these same keystrokes may also generate Text events that the UI can pass to the application if no valid UI action corresponds to the "Alt+F" Command event).

In FIG. 6b, the appearance generator has changed the look of the top-level and pulldown menus to correspond to a pen primary input device. Checkboxes (e.g., 134) have been added next to each command in top-level menu 130 and pulldown menu 132. The "File" checkbox is shown after checking with a pen to activate pulldown menu 132. As in the scrollbar case presented earlier, the application that created the menu elements need not be concerned with how the UI generated the menus it requested, and will receive the same menu selection messages from the UI regardless of how the display mode of the UI is adapted. And yet the user can easily manipulate the application controls with whatever input device they choose to use.

Figure 7A:
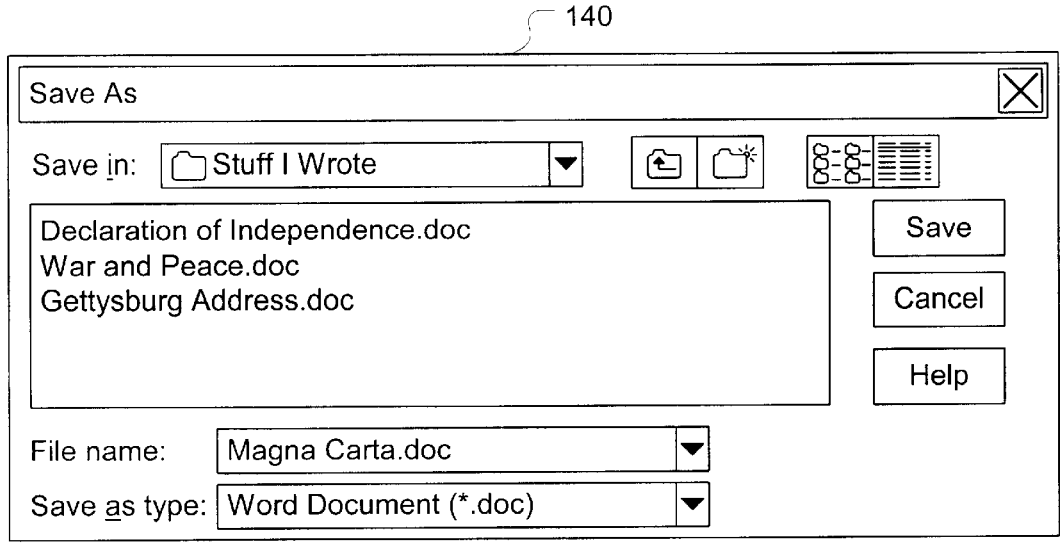
FIGS. 7a and 7b show a-third graphical interface element, i.e., a "Save As" dialog box, as adapted by a user interface embodiment for two different types of primary input devices.
Figure 7B:
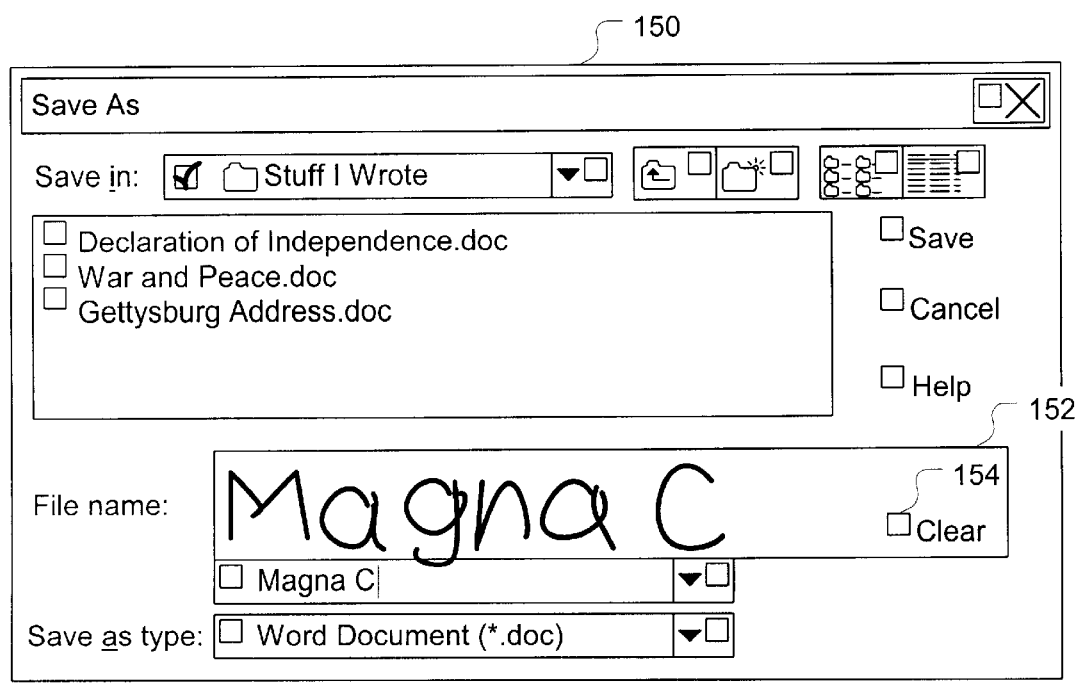

FIGS. 7a and 7b show permutations of another graphical interface element, a standard dialog box that may be called by an application to perform a "Save As" operation on the current work. "Save As" dialog box 140 of FIG. 7a uses pulldown lists, buttons, and a clickable listbox to allow a user to navigate a directory structure, enter a new file name (or select an existing name), and save the work in the selected file name. Dialog box 140 processes Locator, Command, and Text logical inputs produced by the mouse and keyboard to accomplish these functions.

Although an entirely different format for the "Save As" operation could exist when the PID is a pen, FIG. 7b shows a "Save As" dialog box 150 adapted to pen input, but retaining a large degree of the functionality of dialog box 140. As with previous examples, checkboxes have been added to selectable items from lists and buttons. A major difference is the inclusion of a handwriting box 152 for entering a file name. Handwriting box 152 may include further controls useful when handwriting, such as the "Clear" checkbox control 152 that can be used to erase and start over.

It will be appreciated by those of ordinary skill that a wide variety of appearances and control methods can be devised for a user interface. The present invention does not attempt to describe each of these methods, but instead describes a method for adapting the selected appearances and control methods to the primary input device. To that end, the primary input device selector 70 shown in FIG. 4 is useful in signaling when the user interface should adapt a new appearance.

Figure 8:
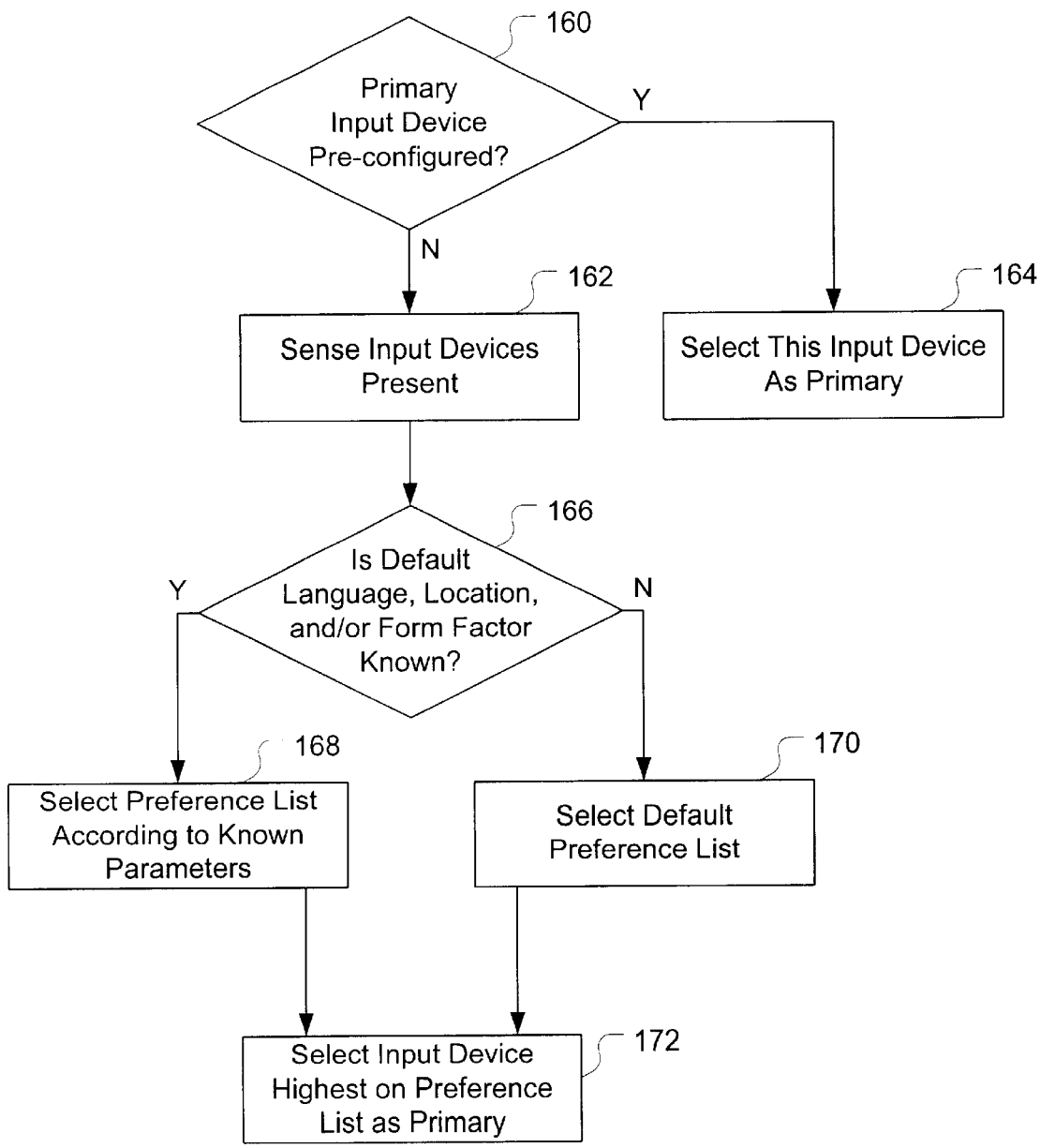
FIG. 8 contains a high-level flow chart illustrating one method of determining a primary input device for a system with multiple input devices.

A simple primary input device selector can merely provide a user with a manual method to select a primary input device. FIG. 8 illustrates, at a high level, one method of operation of a primary input device selector that provides a more automatic method of selection.

When the selector is activated upon boot-up, user login, etc., decision block 160 first determines if a pre-configured preference for a primary input device has been set. If so, block 164 simply sets this as the primary input device. Otherwise, block 162 senses the input devices present for use. Decision block 166 then examines several parameters, if available, including the default language that is normally used by this system or this user, the location and/or form factor of the system (e.g., is it outputting to a television, to a pen screen, etc.) or similar indicators of likely methods of input. If no additional parameters are known, control is transferred to block 170. If additional parameters are known, control is passed to block 168.

Block 170 loads a default preference list for the system, ranking in descending order the input devices, from most preferred to least preferred. Block 168 loads one of a group of similar preference lists, a list most appropriate in light of the known additional parameters.

Block 172 compares the selected preference list to the available input devices, selecting the available input device highest on the list as primary.

Although not shown in FIG. 8, another function of the primary input device selector can be one that, when enabled, senses which input device is currently in use, and switches the primary input device designation when the user begins using a different device.

One other optional function of an adaptable user interface according to the invention is a logical input transmogrifier to provide backwards compatibility with legacy applications. The transmogrifier compensates for an old application's lack of ability to understand logical event messages by attempting to form equivalent legacy events. For instance, when a Locator event occurs, the transmogrifier can attempt to form a mouse movement event message and dispatch this to an application, even if the locator event relates to a non-mouse input. And when speech recognition or handwriting recognition produces a Text event for a character, the character can be represented as keypress (down and then up) legacy events.

One of ordinary skill in the art will recognize that the concepts taught herein can be tailored to a particular application in many ways. Such implementation details are encompassed within the invention, and are intended to fall within the scope of the claims.

What is claimed is:

1. A method for interfacing a computer with a user, the method comprising:
    translating input from a physical input device to one or more logical device inputs, the logical device inputs representing a set of logical devices that can be shared concurrently by multiple physical input devices having respective device types corresponding to different ones of a plurality of possible physical input device types;
    generating one or more logical events corresponding to the logical device inputs;
    operating a user interface in response to the logical events;
    configuring a selected physical input device type as a primary input device; and
    adapting the display generated by the user interface depending on the type of the primary input device.

2. The method of claim 1, wherein the set of logical devices comprises a locator device, a text device, a command device, and a valuator device.

3. The method of claim 1, wherein translating input comprises evaluating, for each logical device, whether a particular input or set of inputs from one or more physical input devices matches the conditions for generation of a logical device input, and generating a logical device input for that logical device when the conditions are met.

4. The method of claim 1, wherein configuring a selected physical input device type as a primary input device comprises sensing the type of physical input device being employed by a user, and selecting this type as the primary input device.

5. The method of claim 4, wherein the sensing and selecting steps occur automatically during operation of the user interface.

6. A computer user interface comprising:

a first logical device mapper capable of accepting input from a first physical input device, the mapper translating input from the first physical input device into one or more logical device inputs representing a set of logical devices that can be shared concurrently by multiple physical input devices;

an event generator to construct logical events corresponding to logical device inputs; and an adaptive user interface to respond to the events and update a display output based on the events, the adaptive user interface having different display modes keyed to different physical input device types, the adaptive user interface configuring a selected physical input device type as a primary input device, and adapting the display generated by the user interface depending on the type of the primary input device.

7. The computer user interface of claim 6, further comprising a second logical device mapper capable of accepting input from a second physical input device of a device type different from the first physical input device, the second mapper translating input from the second physical input device into one or more logical device inputs representing the set of logical devices that can be shared concurrently by multiple physical input devices.

8. An apparatus comprising a computer-readable medium containing computer instructions that, when executed, cause a processor to perform a method comprising:

translating input from a physical input device to one or more logical device inputs, the logical device inputs representing a set of logical devices that can be shared concurrently by multiple physical input devices having respective device types corresponding to different ones of a plurality of possible physical input device types;

generating one or more logical events corresponding to the logical device inputs;

operating a user interface in response to the logical events;

configuring a selected physical input device type as a primary input device; and adapting a display generated by the user interface depending on the type of the primary input device.

9. The apparatus of claim 8, wherein the set of logical devices comprises a locator device, a text device, a command device, and a valuator device.

10. The apparatus of claim 8, wherein translating input comprises evaluating, for each logical device, whether a particular input or set of inputs from one or more physical input devices matches the conditions for generation of a logical device input, and generating a logical device input for that logical device when the conditions are met.

11. The apparatus of claim 8, wherein configuring a selected physical input device type as a primary input device comprises sensing the type of physical input device being employed by a user, and selecting this type as the primary input device.

12. The apparatus of claim 11, wherein the sensing and selecting steps occur automatically during operation of the user interface.

13. A method for interfacing a computer with a user, the method comprising:

translating a single input from a physical input device to a plurality of logical device inputs, the logical device inputs representing a set of logical devices that can be shared concurrently by multiple physical input devices having respective device types corresponding to different ones of a plurality of possible physical input device types;

generating one or more logical events corresponding to the logical device inputs;

operating a user interface in response to the logical events;

configuring a selected physical input device type as a primary input device; and adapting the display generated by the user interface depending on the type of the primary input device.

14. The method of claim 13, wherein the set of logical devices comprises a locator device, a text device, a command device, and a valuator device.

15. The method of claim 13, wherein configuring a selected physical input device type as a primary input device comprises sensing the type of physical input device being employed by a user, and selecting this type as the primary input device.

16. The method of claim 15, wherein the sensing and selecting steps occur automatically during operation of the user interface.

* * * * *